US007948979B2

(12) United States Patent
Hefty

(10) Patent No.: US 7,948,979 B2
(45) Date of Patent: May 24, 2011

(54) PROGRAMMABLE NETWORK INTERFACE CARD

(75) Inventor: Mark Sean Hefty, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 12/128,359

(22) Filed: May 28, 2008

(65) Prior Publication Data

US 2009/0296699 A1 Dec. 3, 2009

(51) Int. Cl.
*H04L 12/28* (2006.01)
*H04L 12/56* (2006.01)
*G06F 15/167* (2006.01)
*G06F 3/00* (2006.01)
*G06F 5/00* (2006.01)

(52) U.S. Cl. ........... 370/389; 370/392; 709/212; 710/36
(58) Field of Classification Search .................. 370/892; 709/212; 710/36
See application file for complete search history.

(56) References Cited

U.S. PATENT DOCUMENTS

| 5,878,217 | A * | 3/1999 | Cherukuri ........... 709/212 |
| 2005/0097242 | A1* | 5/2005 | Sarkar et al. ........... 710/36 |
| 2005/0138134 | A1* | 6/2005 | Poisner et al. ........... 709/212 |
| 2005/0213570 | A1* | 9/2005 | Stacy et al. ........... 370/389 |
| 2006/0050694 | A1* | 3/2006 | Bury et al. ........... 370/389 |
| 2006/0292292 | A1* | 12/2006 | Brightman et al. ........... 427/66 |
| 2007/0253430 | A1* | 11/2007 | Minami et al. ........... 370/395.52 |
| 2008/0263171 | A1* | 10/2008 | Craft et al. ........... 709/212 |
| 2009/0172302 | A1* | 7/2009 | Kyusojin et al. ........... 711/154 |

* cited by examiner

*Primary Examiner* — Pankaj Kumar
*Assistant Examiner* — Lonnie Sweet
(74) *Attorney, Agent, or Firm* — Blakely, Sokoloff, Taylor & Zafman LLP

(57) ABSTRACT

A computing system comprises a programmable network interface card and a host comprising a memory and a transport handler. The programmable network interface card may process a frame received over a network, and determine whether packet data included in the frame is to be directly placed in a first region in a memory. The programmable network interface may comprise a network direct memory access engine (NDE), which may cause transfer of the packet data directly to the first region in the memory if the packet data is to be directly placed into the first region in the memory. The programmable network interface card may cause transfer of the packet data to the transport handler in response to determining that the packet data is not to be directly placed in the first region in the memory.

12 Claims, 5 Drawing Sheets

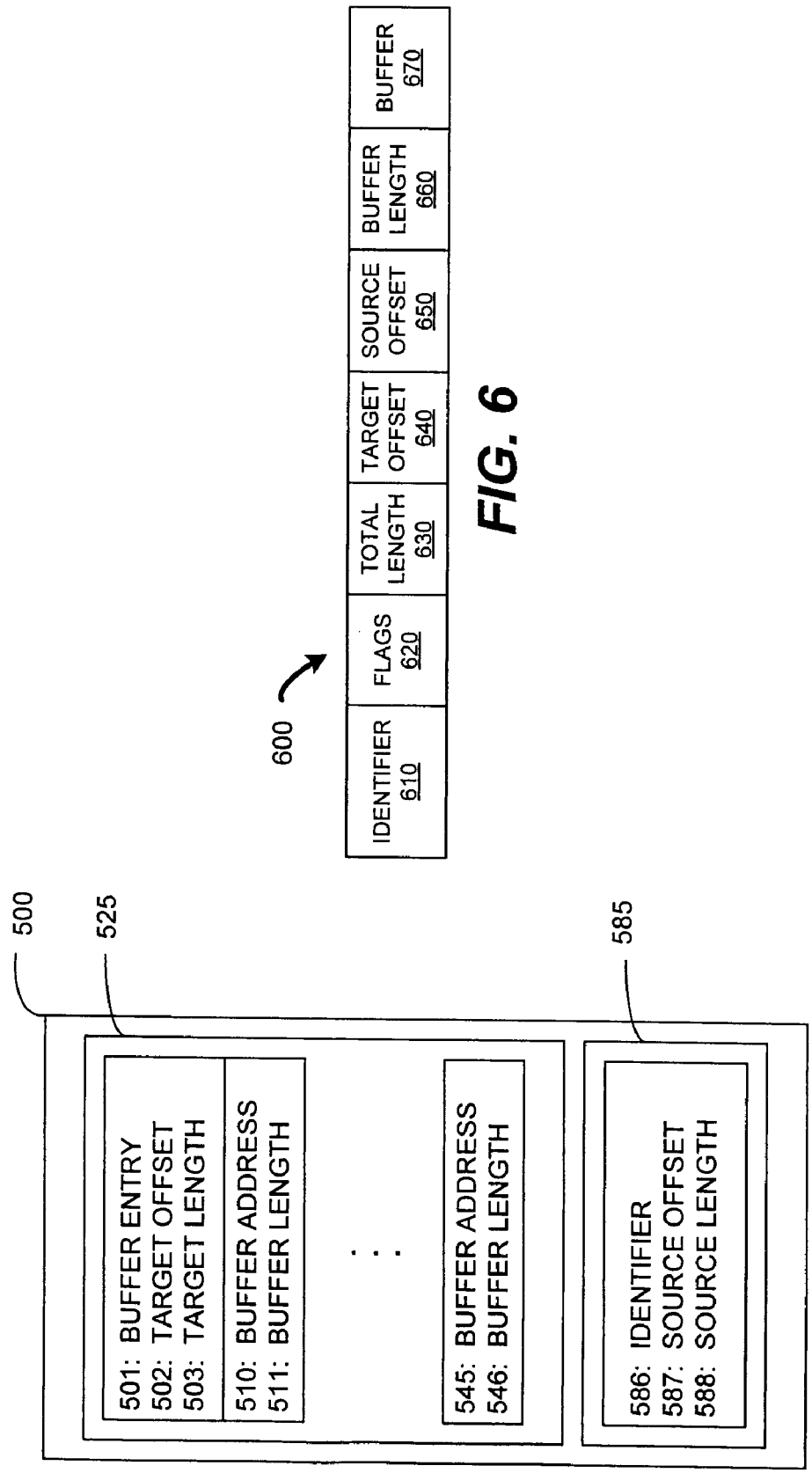

PROGRAMMABLE NETWORK INTERFACE CARD

BACKGROUND

A networked computing device receives data units over a network and processes the data units, which may include direct data placement. Direct data placement approach may decrease memory bandwidth requirements and processing unit overhead associated with data movement. A traditional network interface card (NIC) provisioned in the networked computing device may lack the ability to support direct data placement. A current generation of network interface cards (NICs) may provide support for direct data placement. The current generation NICs, however, provides direct data placement capability by supporting transport offload technique.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 illustrates a network direct memory access request (NDR) according to one embodiment.

FIG. 6 illustrates a network interface packet according to one embodiment.

DETAILED DESCRIPTION

The following description describes embodiments of a programmable network interface card. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; and flash memory devices. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
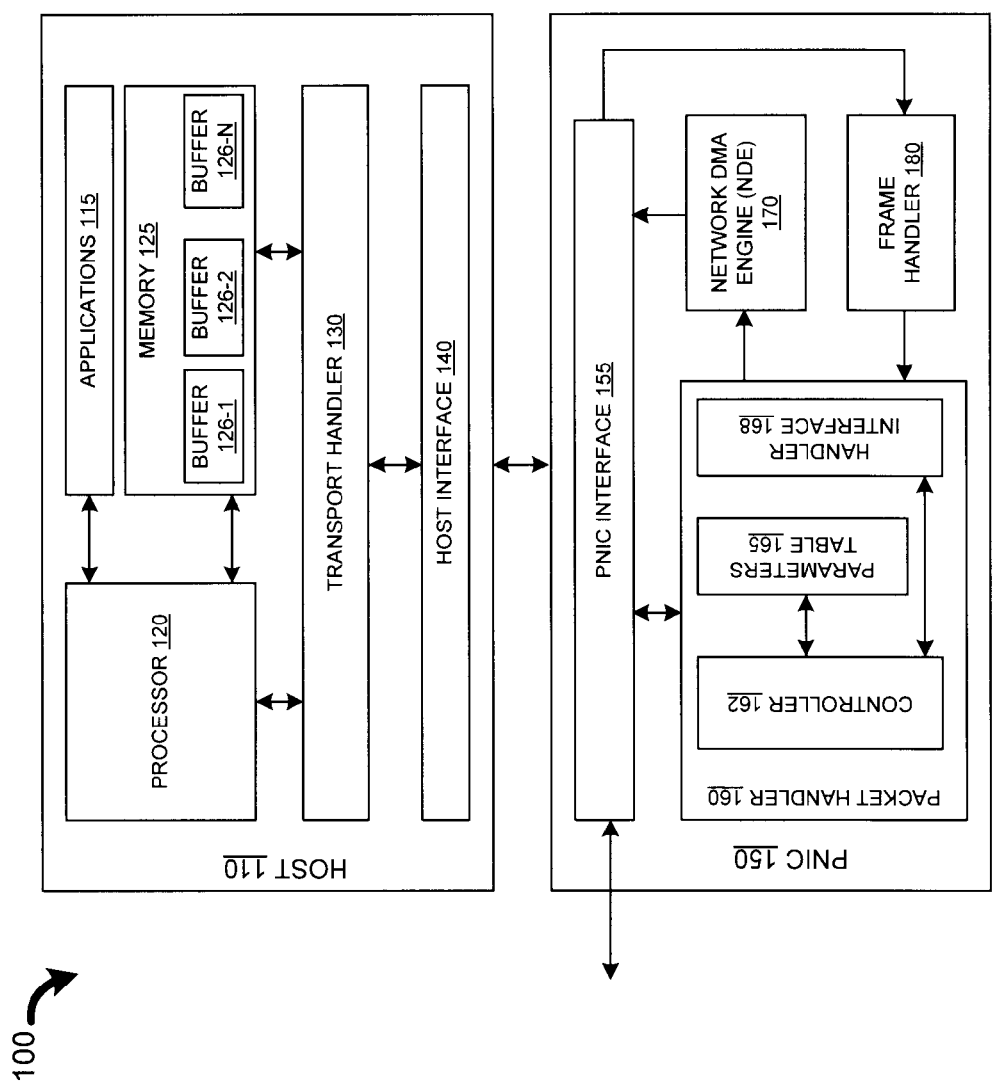
FIG. 1 illustrates a networked computing system 100, including a programmable network interface card (PNIC) according to one embodiment.

A networked computing system 100, including a programmable network interface card (PNIC) in accordance with one embodiment, is illustrated in FIG. 1. In one embodiment, the networked computing system 100 may comprise a host 110 and a programmable network interface card 150.

The host 110 may comprise a processor 120, memory 125, transport handler 130, and host interface 140.

In one embodiment, the host interface 140 may transfer data units between the host 110 and the programmable network interface card (PNIC) 150. In one embodiment, the host interface 140 may provide electrical, physical, and protocol interfaces between the host 110 and the PNIC 150. In one embodiment, the host interface 140 may support protocols such as transport control protocol (TCP) over internet protocol (IP), user datagram protocol (UDP), and such other similar protocols.

In one embodiment, the processor 120 may retrieve data units stored in the memory 125, process the data units, and store the data units in the memory 125. In one embodiment, in the absence of a transport handler 130, the processor 120 may receive data units from the host interface 140 and transfer the data units to the memory 125. However, using processing cycles of the processor 120 to transfer data from the PNIC 150 to the memory 125 may consume the processing cycles and such an approach may not be desirable. By provisioning a transport handler 130 to transfer data units, the processing cycles of the processor 120 may be conserved by directly placing the data units in the buffers 126. Also, such an approach may conserve the bandwidth on the memory bus.

In one embodiment, the application 115 may comprise applications such as e-mail, file transfer protocol (ftp) and similar other applications. In one embodiment, the application 115 may be supported by the processor 120. In one embodiment, the application 115 may provide network DMA requests (NDR) to the PNIC 150. In one embodiment, the network DMA request may specify the target memory location and the source location such that the packet data originating at the specified source location is to be stored in the specified target memory location.

In one embodiment, the application 115 may program the PNIC 150 such that the incoming frames including a specific pattern are directly placed in the buffers 126. In one embodiment, the application 115 may process the packet data stored in the buffers 126. In one embodiment, the application 115 may provide one or more network DMA requests (NDR) to the PNIC 150 either directly or through calls made to a driver. In one embodiment, the network DMA requests may be used to determine whether packet data received over the network is a candidate for direct data placement.

In one embodiment, the transport handler 130 may receive a frame or packet data from the PNIC 150. In one embodiment, if the transport handler receives a frame, the transport handler 130 may handle a complete transport offload. In one embodiment, the transport offload operations may include cyclic redundancy code (CRC) check, hardware addresses check, frame type check, stripping of the frame header, a lookup on destination IP address in an address cache, calculation and check of the IP checksum, stripping of the IP header, parsing of TCP flags, a lookup on source and destination IP addresses and ports, creation of TCP pseudo-header checksum, calculation of the TCP checksum, stripping the TCP header and such other similar operations.

In one embodiment, if the transport handler 130 receives packet data, the transport handler 130 may store the packet data to one of the buffers 126 identified by the network DMA requests. In one embodiment, the link between the PNIC 150 and the host 110 may include a PCI Express, small computer system interface (SCSI), and such other similar interconnects.

In one embodiment, the PNIC 150 may comprise a PNIC interface 155, a packet handler 160, a network DMA engine (NDE) 170, and a frame handler 180. In one embodiment, the PNIC interface 155 may receive frames over the network and pass the frames to the frame handler 180. In one embodiment, the PNIC interface 155 may receive a frame from the packet handler 160 or packet data from the NDE 170 and forward the frame or the packet data to the host 110. In one embodiment, the PNIC interface 155 may provide electrical, physical, and protocol interface between the PNIC 150 and the host 110 and the network.

In one embodiment, the frame handler 180 may receive a frame and perform data link layer protocol operations. In one embodiment, the frame handler 180 may validate the frame CRC, match the frame destination with the PNIC address, and such other similar operations. In one embodiment, the frame handler 180 may forward the frame to the packet handler 160. In one embodiment, the frame received by the PNIC 150 may include a network DMA protocol (NDP) packet.

In one embodiment, the packet handler 160 may comprise a controller 162, a parameter table 165, and a handler interface 168. In one embodiment, the handler interface 168 may perform provide an interface between the packet handler 160 and the NDE 170, the frame handler 180, and the host 110.

In one embodiment, the controller 162 may receive parameter values from the host 110 and store the parameter values in the parameter table 165. In one embodiment, the controller 162 may receive a frame from the frame handler 180, examine the contents of the frame, and determine whether network DMA engine NDE 170 is to be invoked using the parameter values. In one embodiment, the controller 162 may use parameter values that together may form a frame descriptor. In one embodiment, the frame descriptor may comprise parameter values such as a frame offset value, a mask value, and a frame identifier to determine whether the incoming frame is to be sent to the NDE 170.

In one embodiment, the controller 162 may use the frame offset value to identify the bit position starting from which the frame is to be masked. In one embodiment, the controller 162 may generate a masked frame by masking the incoming frame using the mask value starting from the bit position identified by the frame offset value. In one embodiment, the masked frame is compared with the frame identifier and the incoming frame is designated as a candidate to be sent to NDE 170 if the framed mask matches with the frame identifier. In one embodiment, the controller 162 may be programmed to handle frames generated using various protocols standards.

For example, the frame identifier may be of Ethernet type and the controller 162 may generate a masked frame using a frame offset value of 14 bytes and a mask value of 2 bytes (=0×0800). In one embodiment, by generating the masked frame and comparing the masked frame with the frame identifier, the controller 152 may ensure that the PNIC 150 includes hardware capabilities to process the incoming frame.

In one embodiment, the frame descriptor may also comprise a network DMA protocol (NDP) offset and a network DMA protocol (NDP) length. In one embodiment, the controller 162 may use NDP offset to identify the start of a NDP packet within the incoming frame that is designated as a candidate to be sent to NDE 170. In one embodiment, the controller 162 may identify the NDP packet based on the NDP length. In one embodiment, the NDP packet may equal the NDP length starting from a bit position identified by the NDP offset. In one embodiment, the controller 162 may transfer the NDP packet to the NDE 170.

In one embodiment, if the masked frame does not match the frame identifier, the controller 162 may not invoke the network DMA engine. In one embodiment, the controller 162, in such a case, may transfer the frame to the transport handler 130.

In one embodiment, the network DMA engine (NDE) 170 may examine the NDP packet and check it against the list of programmed network DMA requests (NDR). In one embodiment, the NDE 170 may return the NDP packet to the packet handler 160 if the NDP packet does not have a matching request. In one embodiment, the NDE 170 may set the status of the NDP packet to 'unhandled' before transferring the NDP packet to the packet handler 160. In one embodiment, the network DMA engine (NDE) 170 may perform the DMA operation if a NDR exists for the NDP packet.

In one embodiment, the NDE 170 may calculate the CRC over the NDP packet, while performing the DMA operation. After the DMA completes, the NDE 170 may return the status of the operation and the calculated CRC to the packet handler 160. If the DMA operation of the packet is fully complete, the NDE 170 may set the status as 'handled-complete'. Otherwise, the NDE 170 may set the status of the NDP packet to 'handled-partial'.

Figure 2:
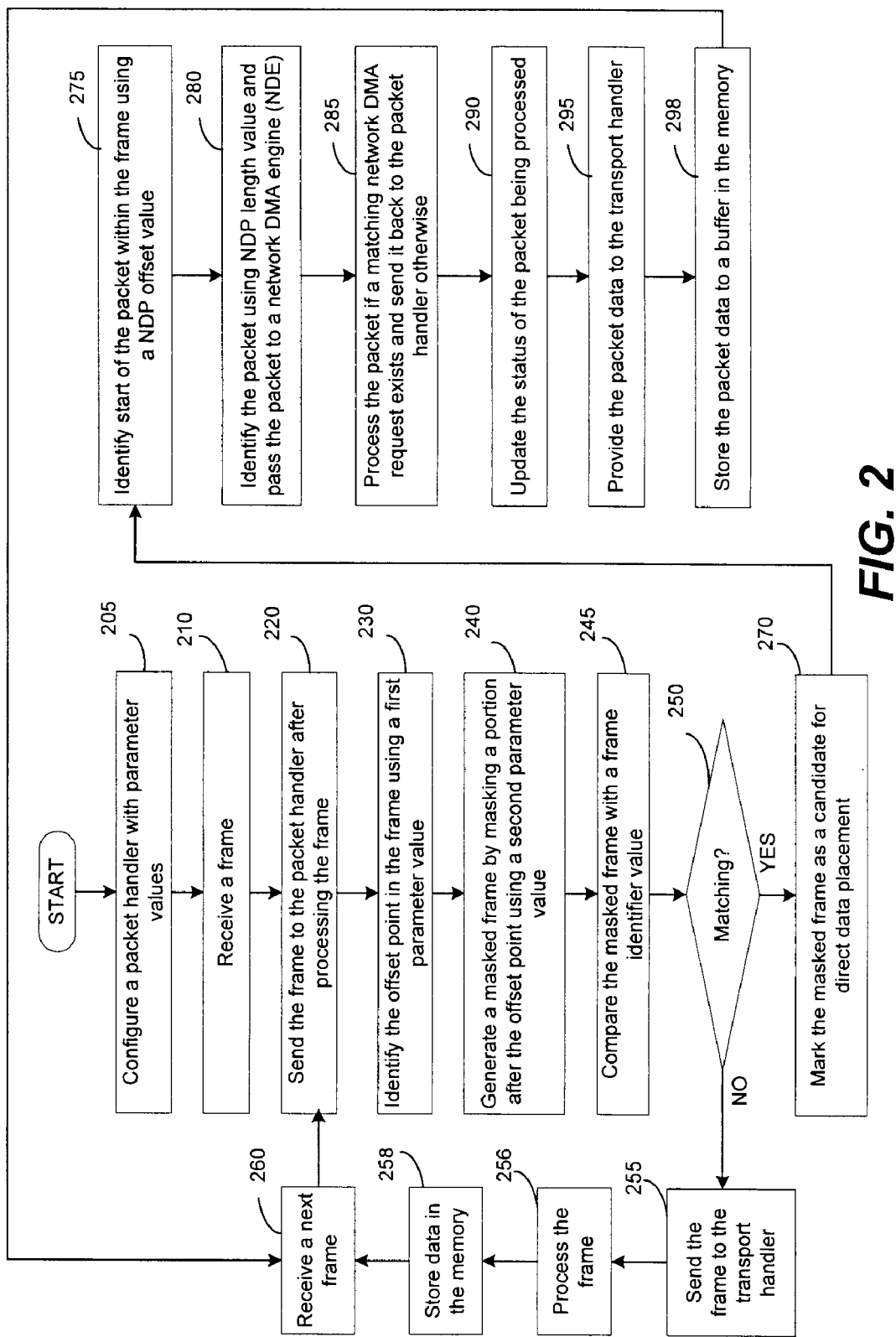
FIG. 2 is a flow diagram illustrating operations that may be performed by the PNIC 150 according to one embodiment.
Figure 2:
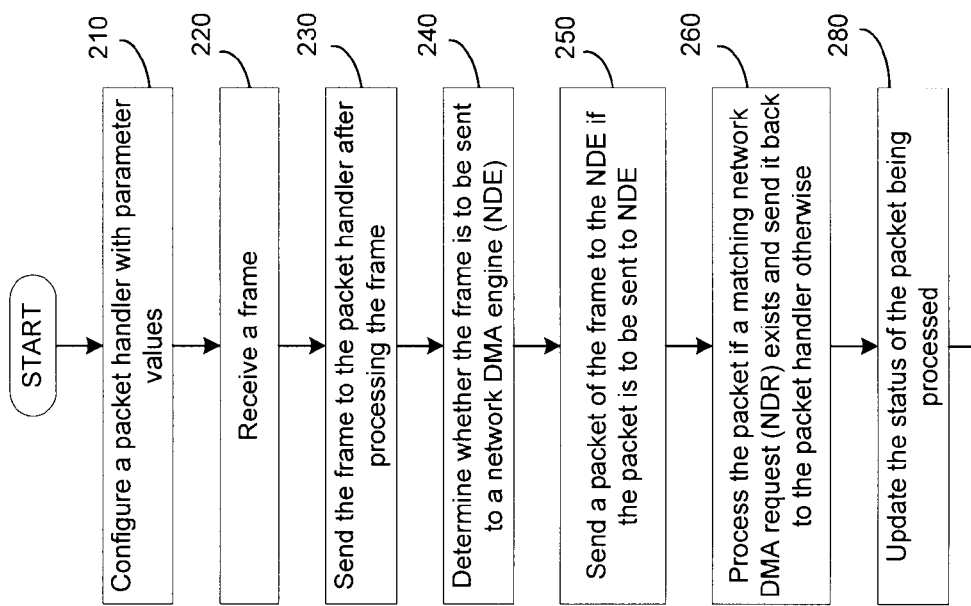

A flow diagram illustrating DMA operations, which may be performed by the PNIC 150 in accordance with one embodiment, is illustrated in FIG. 2.

In block 205, the host 110 may configure the PNIC 150 with one or more parameter values. In one embodiment, the parameter values may comprise a first, second, third, fourth, and a fifth value representing a frame offset value, a mask value, a frame identifier, a NDP offset value, and a NDP length.

In block 210, the frame handler 180 may receive an incoming frame. In one embodiment, the incoming frame may be received over a network. In block 220, the frame handler 180 may send the incoming frame to the packet handler 160. In one embodiment, the frame handler 180 may perform data link layer protocol operations before sending the frame to the packet handler 160.

In one embodiment, the frame handler 180 may validate the frame CRC, match the frame destination with the PNIC address, and such other similar operations. In one embodiment, the frame handler 180 may forward the frame to the packet handler 160. In one embodiment, the frame received by the PNIC 150 may include a network DMA protocol (NDP) packet.

In block 230, the packet handler 160 may identify the offset point in the incoming frame using the first parameter value (i.e., frame offset value). In one embodiment, the frame offset value may identify the bit position from the start bit of the frame.

In block 240, the packet handler 160 may generate a masked frame by masking the incoming frame using a second parameter value (i.e., mask value). In one embodiment, the packet handler 160 may mask the contents of the frame starting from the offset point identified by the frame offset value.

In block 245, the packet handler 160 may compare the masked frame with a third parameter value (i.e., frame identifier). In one embodiment, the frame identifier may identify the frames that the PNIC 150 is capable of processing.

In block 250, the packet handler 160 may check whether the masked frame matches with the frame identifier and control passes to block 255 if the masked frame does not match with the frame identifier and control passes to block 270 if the masked frame matches with the frame identifier.

In block 255, the packet handler 160 may send the frame to the transport handler 130. In block 256, the transport header 130 may process the frame. In block 258, the transport handler 130 may store data in the memory 125. In block 260, the PNIC 150 may receive a next frame and control passes to block 220.

In block 270, the packet handler 160 may mark the masked frame as a candidate for being sent to the network DMA protocol engine (NDE) 170. In block 275, the packet handler 160 may identify the start of the packet within the frame using the NDP offset value (i.e., fourth parameter value).

In block 280, the packet handler 160 may identify the NDP packet within the frame using the NDP length value (i.e., fifth parameter value) and the packet handler 160 may send the NDP packet to the NDE 170.

In block 285, the NDE 170 may check if a matching network DMA request exist and process the NDP packet if a matching NDR exists and the packet is sent back to the packet handler 160 otherwise.

In block 290, the NDE 170 may update the status of the packet being processed. In one embodiment, the NDE 170 may mark the status as 'handled-complete' if the packet processing is complete and may mark the status as 'handled-partial' if the packet processing is incomplete.

In block 295, the NDE 170 may provide the packet data to the transport handler 130. In block 298, the transport handler 130 may receive the packet data from the NDE 170 and store the packet data in one of the buffers 126 specified in the network DMA request (NDR).

Figure 3:
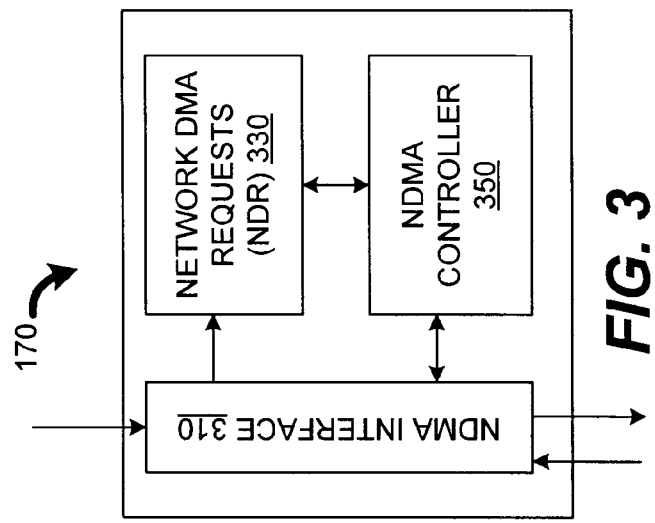
FIG. 3 illustrates a networked direct memory access engine (NDE) 170 of the PNIC 150 according to one embodiment.

A network DMA engine (NDE) 170 provisioned in the PNIC 150, which performs DMA in accordance with an embodiment is illustrated in FIG. 3. In one embodiment, the NDE 170 may comprise a NDMA interface 310, a network DMA request (NDR) 330, and a NDMA controller 350.

In one embodiment, the NDMA interface 310 may couple the NDE 170 to the packet handler 160. In one embodiment, the NDMA interface 310 may receive packets from the packet handler 160. In one embodiment, the NDMA interface 310 may transfer the status of the packet being handled by the NDE 170.

In one embodiment, the NDR 330 may receive network DMA requests from the application 115 of the host 110. In one embodiment, the network DMA requests may be stored in a table within the NDR 330. In one embodiment, the network DMA requests such as a request 500 of FIG. 5 may comprise a host descriptor 525 and a network descriptor 585.

In one embodiment, the host descriptor 525 may be used to identify a target region in the memory 125 for storing the packet data. In one embodiment, the host descriptor 525 may comprise a buffer entry 501, target offset 502, a target length 503, a buffer address 510 and 545, and a buffer length 511 and 546. In one embodiment, the buffer entry 501 may reference a current scatter-gather entry (SGE) in which the received packet data is to be placed.

In one embodiment, the target offset 502 may specify the offset from the start of the current SGE in which the packet data is to be placed. In one embodiment, the target length 503 may specify the total size of the target buffers 126. In one embodiment, the buffer address 510 and 545 may specify the buffer (126) into which the packet data may be placed and the buffer length 511 and 546 may indicate the amount of packet data to be placed in the buffer (126) specified by the buffer address 510 and 545.

In one embodiment, the packet descriptor may be used to identify the source of packet data using a network interface packet such as a packet 600 of FIG. 6. In one embodiment, the packet descriptor 585 may comprise an identifier field 586, a source offset 587, and a source length 588. In one embodiment, the identifier field 586 may be used to match the network packets with network DMA requests such as the request 500. In one embodiment, the identifier field 586 may be same for the NDP packets for a given network DMA request.

In one embodiment, the source offset 587 may be used to further identify the NDP packets. The source offset 587 may change for each NDP packet matching an NDR. For example, the source offset 587 may be initialized to 0 for a first NDP packet, and incremented by the packet buffer length for a second NDP packet. In one embodiment, the source offset of a received NDP packet should match the network descriptor source offset 586 before the network packet is processed.

In one embodiment, the source length 588 may be used to specify the size of the data to be received. In one embodiment, if the source length 588 is known, then the source length 588 may be programmed as a part of the network DMA request. In one embodiment, if the source length 588 is left un-initialized, then a value equaling the total length of the network interface packet, if available, may be used as the source length 588.

In one embodiment, the NDMA controller 350 may examine the NDP packet and check it against the list of programmed network DMA requests (NDR) stored in NDR block 330. In one embodiment, the NDMA controller 350 may return the NDP packet to the packet handler 160 if the NDP packet does not have a matching request. In one embodiment, the NDMA controller 350 may set the status of the NDP packet to 'unhandled' before transferring the NDP packet to the packet handler 160. In one embodiment, the NDMA controller 350 may perform the DMA operation if a NDR exists for the NDP packet.

Figure 4:
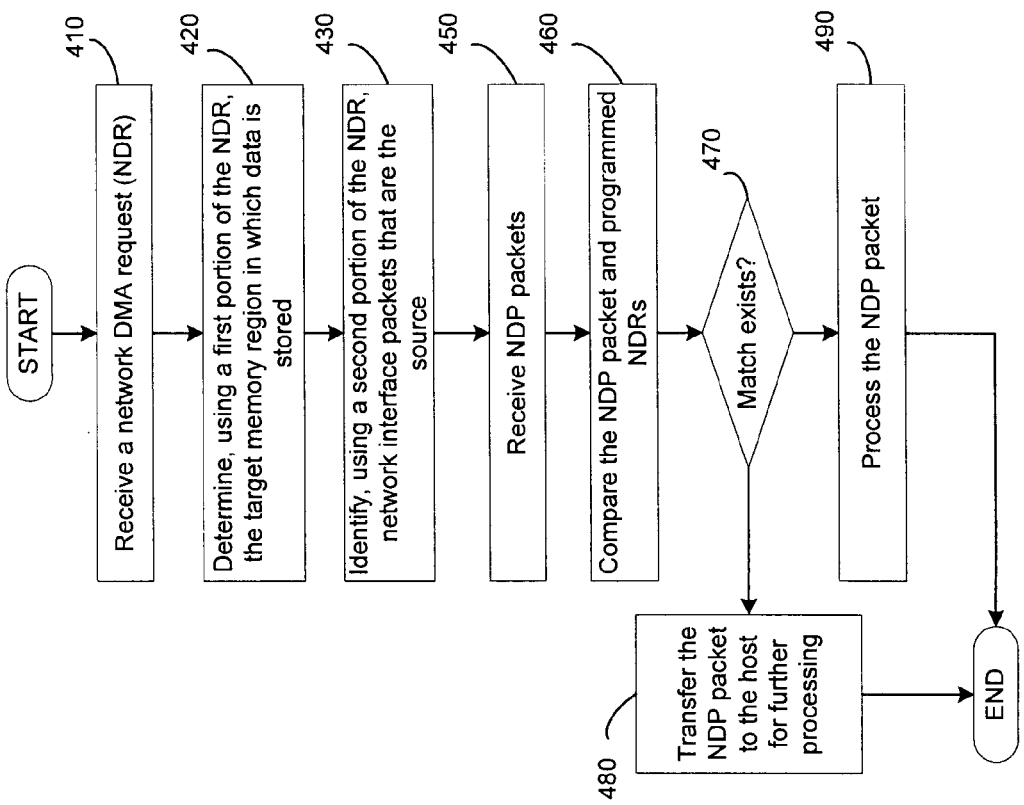
FIG. 4 is a flow diagram illustrating data transfer operation performed by the NDE 170 according to one embodiment.

A DMA operation of the NDE 170 in accordance with one embodiment is illustrated in FIG. 4. In block 410, the NDMA controller 350 may receive one or more network DMA requests and store the requests in the NDR block 330.

In block 420, the NDMA controller 350 may determine, using a first portion (i.e., the host descriptor 525) of the NDR, the target memory region such as the buffer 126-1 into which the data is to be stored. In one embodiment, the NDMA controller 350 may use the buffer entry 501, target offset 502, and the target length 503 to identify the target memory region such as the buffers 126 provisioned within the memory 125.

In block 430, the NDMA controller 350 may identify, using a second portion of the NDR, network interface packets that are the source. In one embodiment, the network interface packet may comprise a packet 600, which may include one or more fields 610-670. In one embodiment, the packet 600 may comprise an identifier field 610, flags 620, total length 630, target offset 640, source offset 650, buffer length 660, and a buffer 670.

In one embodiment, the Identifier 610 may be same for all the NDR packets belonging to a single NDR. The identifier 610 may be a single field in a network packet header, or a complex identifier comprising several fields spread across multiple network headers. For example, a complex identifier may consist of an Ethernet EtherType field; IP version, source, destination, and protocol fields; and TCP source and destination ports.

In one embodiment, the flags 620 may allow NDR packets to direct the operation of the NDE 170. In one embodiment, the flags 620 may be used to indicate which fields in the network interface packet 600 are available, and may direct the NDE 170 to initialize NDR fields. In one embodiment, the Total Length 630 may represent the total size of the data received from the source. In one embodiment, the NDRs may not know the exact size of the data that is sent from the source. In one embodiment, the field Total Length 630 may be included in a first NDR packet of an NDR, and the Total Length 630 may be used to initialize the NDR source length 588, if it is not known.

In one embodiment, the Target Offset 640 may specify an offset in the target memory region in which the data is to be placed. In one embodiment, the Target Offset 640 may not be specified for all operations and if the Target Offset 640 is available, the target offset field 502 in the host descriptor 525 of FIG. 5 may be adjusted.

In one embodiment, the Source Offset 650 may be used to order packets belonging to a single NDR. In one embodiment, the Source Offset 650 may include a packet sequence number. In one embodiment, the Buffer Length 660 may indicate the size of the data buffer in a single network interface packet. In one embodiment, the Buffer 670 may represent the buffer identifier such as buffer 126-1 to which the actual data is to be transferred in the target memory 125.

In block 450, the NDMA controller 350 may receive NDP packets. In block 460, the NDMA controller 350 may compare the NDP packet and the programmed NDRs stored in the NDR block 330.

In block 470, the NDMA controller 350 may check whether a match exists and control passes to block 480 if a match does not exist and to block 490 if a match exists. In block 480, the NDMA controller 350 may transfer the NDP packet to the host 110. In block 490, the NDMA controller 350 may process the NDP packet. In one embodiment, the NDMA controller 350 may set the status of the NDP packet to 'handled-complete' or 'handled-partial' based on whether the packet data transfer to the buffers 126 is complete.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
processing a frame received over a network, wherein the frame includes a packet,
determining whether packet data included in the packet is to be directly placed in a first region in a memory,
transferring the packet data directly to the first region in the memory in response to determining that the packet data is to be directly placed into the first region in the memory, wherein determining whether the packet data is to be directly placed into the first region of the memory includes comparing the packet with a plurality of network requests, processing the packet if a match exists between the packet and the plurality of network requests, and returning the packet if a match does not exist between the packet and the plurality of network requests,
wherein comparing the packet with the plurality of network requests comprises, comparing a first entry of the packet with a host descriptor portion of a plurality of network requests, wherein the host descriptor includes an address of the first region of the memory and comparing a second entry of the packet with a network descriptor portion of the plurality of network requests, wherein the network descriptor includes a source address from which the packet data is to be retrieved,
wherein processing the packet comprises, extracting the packet data from the packet if the first entry matches with the host descriptor of the plurality of packet requests and the second entry matches with the network descriptor of the plurality of packet requests, and forwarding the packet data to the transport handler, and processing the packet that is returned using the packet handler, and
transferring the packet data to a transport handler in response to determining that the packet data is not to be directly placed in the first region in the memory.

2. The method of claim 1, wherein determining whether the packet data is to be directly placed comprises,
generating a masked frame using the frame,
comparing the masked frame and a frame identifier value, and
marking the frame as a candidate to be directly placed in the first region in the memory if the masked frame and the frame identifier value matches.

3. The method of claim 2, wherein generating the masked frame using the frame comprises,
identifying an offset point in the frame using a frame offset value, and
masking the frame using a mask value, wherein masking is performed starting from the offset point.

4. The method of claim 2, wherein the frame identifier value identifies the network protocol used to generate the frame.

5. The method of claim 2, wherein identifying a packet comprising the packet data within the frame comprises,
determining a bit position within the frame using a packet offset value, wherein the bit position represents a starting bit of the packet, and
identifying the bytes starting from the bit position as the packet, wherein the bytes are identified using a packet length value.

6. An apparatus, comprising,
a host comprising a memory and a transport handler, and
a programmable network interface card coupled to the host, wherein the programmable network interface card comprises, a packet handler and a network direct memory access engine coupled to the packet handler,
wherein the transport handler is to, process the frame received from the packet handler before transferring the packet data to the first region in the memory, transfer the packet data to the first region in the memory if the transport handler receives the packet data from the network direct memory access engine, wherein the packet handler is to determine whether packet data included in a frame received over a network is to be directly placed in a first region in the memory, send the packet data to the transport handler if the network direct memory access engine returns the packet data, wherein the packet handler further comprises, a handler interface, a parameters table coupled to the handler interface, and a controller coupled to the handler interface, wherein the handler interface is to receive the frame, wherein the parameters table is to store parameter values including a frame offset value, a mask value, a frame identifier value, packet offset value, and a packet length value, and wherein the controller is to generate a masked frame using the frame, compare the masked frame and a frame identifier value, and mark the frame as a candidate to be directly placed in the first region in the memory if the masked frame and the frame identifier value matches, wherein the frame identifier value identifies the network protocol used to build the frame, identify an offset point in the frame using the frame offset value, and mask the frame using the mask value, wherein masking is performed starting from the offset point, determine a bit position within the frame using the packet offset value, wherein the bit position represents a starting bit of the packet, identify the bytes starting from the bit position as the packet, wherein the bytes are identified using the packet length value, and send the packet to the network direct memory access engine, wherein the network direct memory access engine is to cause transfer of the packet data directly to the first region in the memory in response to determining that the packet data is to be directly placed into the first region in the memory.

7. The apparatus of claim 6, wherein the network direct memory access engine comprises, a network direct memory access interface, wherein the network direct memory access interface is to receive the packet, and a network direct memory access controller, wherein the network direct memory access controller is to compare the packet with a plurality of network requests, process the packet if a match exists between the packet and the plurality of network requests, and return the packet if a match does not exist between the packet and the plurality of network requests.

8. The apparatus of claim 7, wherein the network direct memory access controller is to, compare a first entry of the packet with a first portion of the plurality of network requests, compare a second entry of the packet with a second portion of the plurality of network requests, and determine whether to process the packet based on comparing the first and the second entry of the packet with a first and a second portion of the plurality of network requests.

9. The apparatus of claim 7, wherein the network direct memory access controller is to, extract the packet data from the packet if the first entry matches with the first portion of the plurality of packet requests and the second entry matches with the second portion of the plurality of network requests, and forward the packet data to the transport handler.

10. The apparatus of claim 7, wherein the packet handler is to, receive the packet that is returned, and transfer the packet to the transport handler.

11. The apparatus of claim 7, wherein the host is to support applications, wherein the applications is to generate the plurality of network requests and store the plurality of network requests in the network direct memory access engine.

12. The apparatus of claim 11, wherein a network request of the plurality of network requests comprises a host descriptor portion and a network descriptor portion, wherein the host descriptor includes an address of the first region of the memory, and wherein the network descriptor includes a source address from which the packet data is to be retrieved.

* * * * *